United States Patent
De'Stefani et al.

(10) Patent No.: US 6,820,480 B2
(45) Date of Patent: Nov. 23, 2004

(54) DEVICE FOR MEASURING GAS FLOW-RATE PARTICULARLY FOR BURNERS

(75) Inventors: Pierluigi De'Stefani, Padua (IT); Filiberto Rimondo, Saonara (IT); Roberto Dorigo, Caorle (IT)

(73) Assignee: Sit la Precisa S.p.A., Padua (IT)

( * ) Notice: Subject to any disclaimer, the term of this patent is extended or adjusted under 35 U.S.C. 154(b) by 0 days.

(21) Appl. No.: 10/473,183

(22) PCT Filed: Mar. 26, 2001

(86) PCT No.: PCT/IT01/00151
§ 371 (c)(1),
(2), (4) Date: Sep. 25, 2003

(87) PCT Pub. No.: WO02/077577
PCT Pub. Date: Oct. 3, 2002

(65) Prior Publication Data
US 2004/0089066 A1 May 13, 2004

(51) Int. Cl.⁷ ................................................ G01F 1/68
(52) U.S. Cl. .................................. 73/204.18; 73/204.19
(58) Field of Search ...................... 73/204.11, 204.18, 73/204.19, 204.23

(56) References Cited

U.S. PATENT DOCUMENTS

| | | | |
|---|---|---|---|
| 4,483,200 A | * 11/1984 | Togawa et al. | 73/861.95 |
| 4,969,357 A | * 11/1990 | Mickler | 73/204.11 |
| 5,460,040 A | * 10/1995 | Tada et al. | 73/204.25 |
| 5,869,758 A | 2/1999 | Huiberts | |

FOREIGN PATENT DOCUMENTS

| | | |
|---|---|---|
| DE | 198 55 870 | 12/1999 |
| EP | 0 834 723 | 4/1998 |

OTHER PUBLICATIONS

International Search Report Dated Jan. 4, 2002.

* cited by examiner

*Primary Examiner*—Edward Lefkowitz
*Assistant Examiner*—T Miller
(74) *Attorney, Agent, or Firm*—RatnerPrestia

(57) ABSTRACT

A device for measuring the flow-rate of gas in a duct, particularly for burners. The device includes a gas flow-rate sensor generating a first output signal proportional to the flow-rate detected, a temperature-compensation circuit receiving the first output signal and generating a second output signal proportional to the gas flow-rate detected by the sensor and independent of the temperature of the gas and/or the flow-rate sensor. The compensation circuit has a temperature sensor. The device also includes a calibration circuit receiving the second output signal. The calibration circuit generates a third output signal proportional to the gas flow-rate detected and independent of structural parameters of the flow-rate sensor and/or of the temperature sensor so that the third output signal is correlated with the flow-rate detected and independent of the temperature of the gas, the temperature of the flow-rate sensor, and the structural parameters of the flow-rate sensor.

20 Claims, 2 Drawing Sheets

DEVICE FOR MEASURING GAS FLOW-RATE PARTICULARLY FOR BURNERS

This application is a U.S. national-phase application of International Application No. PCT/IT01/00151.

TECHNICAL FIELD

The present invention relates to a device for measuring gas flow-rate, particularly for burners.

TECHNOLOGICAL BACKGROUND

In known devices, the flow-rate of a gas is generally calculated with the use of a "hot-wire" sensor, that is, a wire resistor which is heated to a predetermined temperature by a current and is positioned in the gas-flow. By "predetermined temperature" is meant a reasonably predictable, as opposed to random, temperature determined before the wire resistor is heated. The flow-rate of the gas is obtained by known physical laws, by measuring the power dissipated by the sensor.

Since the value of the power dissipated is dependent not only on the flow-rate but also on the temperature of the gas, the signal output by the sensor is generally compensated to account for the possible variations of this temperature. For this purpose, a "cold" sensor, also positioned in the gas-flow, is typically used to measure the temperature thereof.

However, a temperature-compensating circuit comprising the sensors mentioned is not easy to design and often requires complex circuit arrangements. Moreover, the cost of the sensors used is usually quite high since the signal output by the sensor also depends on the constructional characteristics of the sensor itself. In order to obtain the same flow-rate measurement from two devices including two different flow-rate sensors, it is therefore necessary for the two sensors to have very similar characteristics.

In addition, in devices according to the prior art, the two sensors for measuring flow-rate and temperature are generally positioned in a single probe to be inserted in the duct through which the gas-flow to be measured is flowing. The introduction of this probe causes a pressure drop in the duct which may lead to malfunction of the apparatus to which the gas is supplied.

German patent application No. DE-A-19855870 and European patent application No. EP-A-0838723 disclose a measuring device. The technical problem underlying the present invention is that of providing a flow-rate measuring device, particularly for burners, which is designed structurally and functionally to prevent the problems discussed with reference to the prior art mentioned.

SUMMARY OF THE INVENTION

The present invention solves the problem posed with a flow-rate measuring device. The device according to the present invention measures the flow-rate of a gas-flow in a duct and includes a gas flow-rate sensor which can generate a first output signal proportional to the flow-rate detected. The device also includes a temperature-compensation circuit to which the first output signal is applied and which can generate a second output signal proportional to the flow-rate of gas detected by the flow-rate sensor and independent of one or both of the temperature of the gas and the temperature of the flow-rate sensor. The compensation circuit has a temperature sensor. The second output signal of the temperature-compensation circuit is applied to a calibration circuit.

The behaviour of the second output signal is represented, for a fixed flow-rate, by a family of curves of known equation depending on the parameters of the flow-rate sensor. The calibration circuit includes a first and a second resistive network of variable overall resistance by which each curve of the family representing the second output signal is made to pass through a first and a second predetermined fixed point, so that the calibration circuit is able to generate a third output signal proportional to the gas flow-rate detected and independent of structural parameters of the flow-rate sensor and/or of the temperature sensor. By "predetermined fixed points" is meant a reasonably predictable, as opposed to random, fixed point determined before the family of curves is drawn. Thus, the third output signal is correlated with the flow-rate detected and independent of the temperature of the gas and/or of the temperature of the flow-rate sensor as well as of the structural parameters of the flow-rate sensor.

BRIEF DESCRIPTION OF THE DRAWINGS

The characteristics and the advantages of the invention will become clearer from the detailed description of a preferred embodiment thereof, described by way of non-limiting example with reference to the appended drawings, in which.

PREFERRED EMBODIMENT OF THE INVENTION

Figure 1:
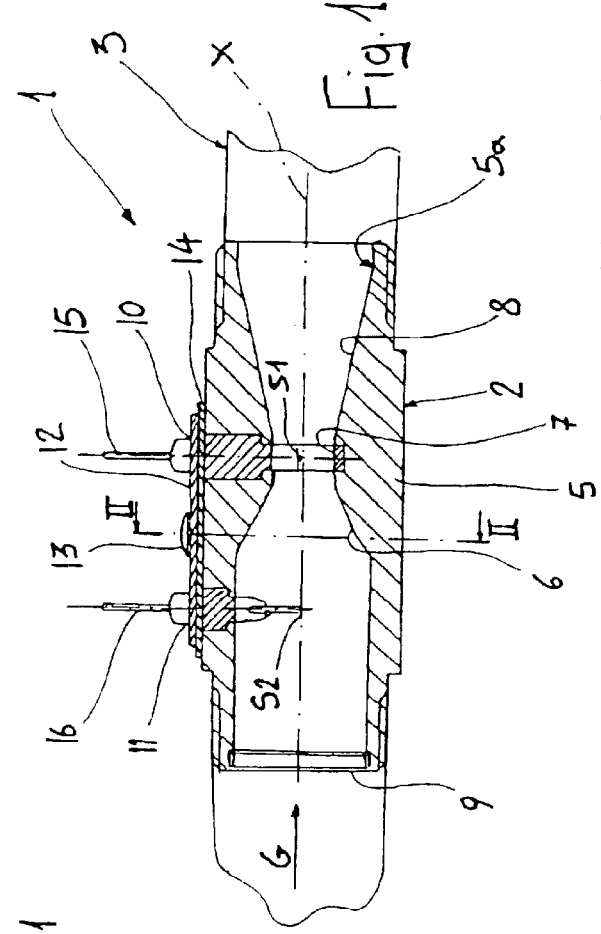
FIG. 1 is a view in side elevation and in section of a flow-rate measuring device according to the present invention.
Figure 2:
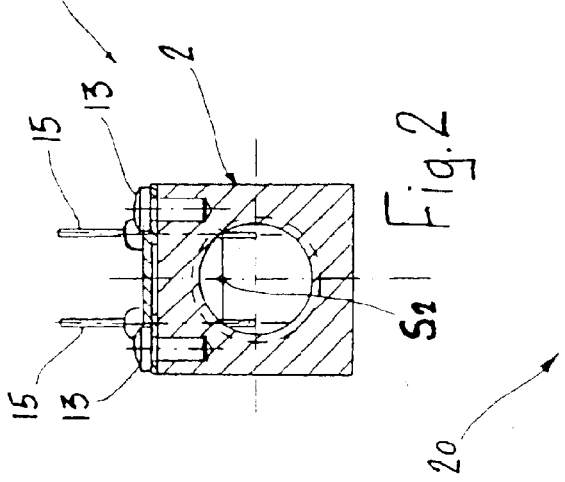
FIG. 2 is a front elevational view of the measuring device of FIG. 1, sectioned on the line II—II.
Figure 3:
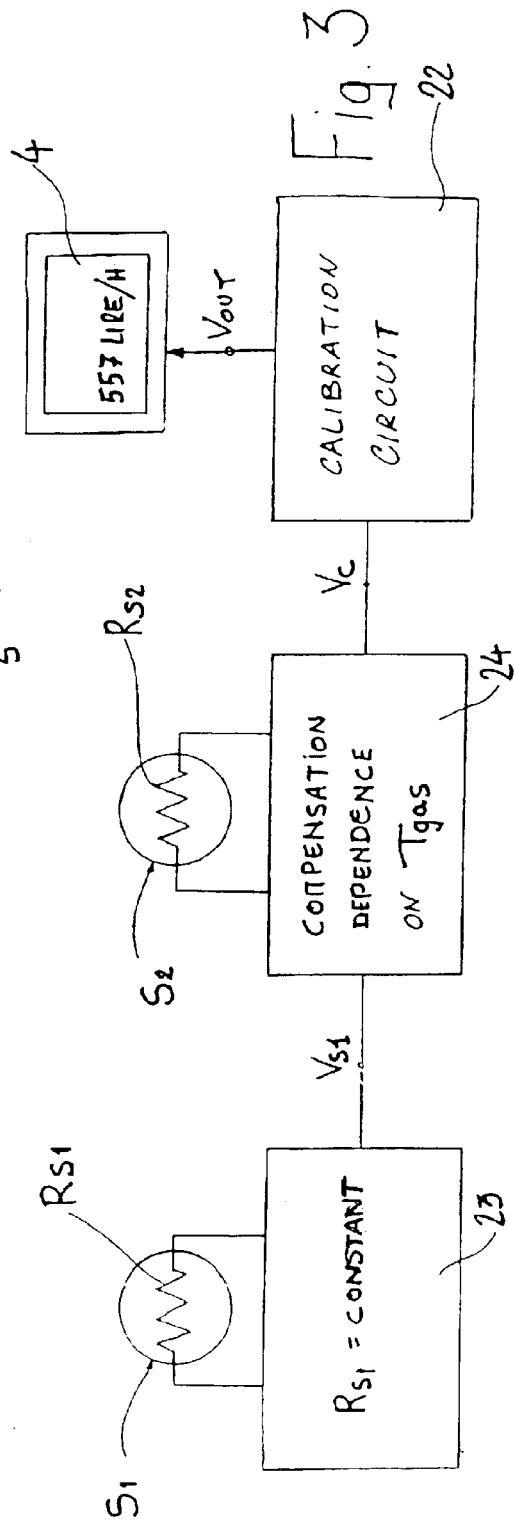
FIG. 3 is a block diagram of a measurement circuit included in the measuring device of FIG. 1.
Figure 4:
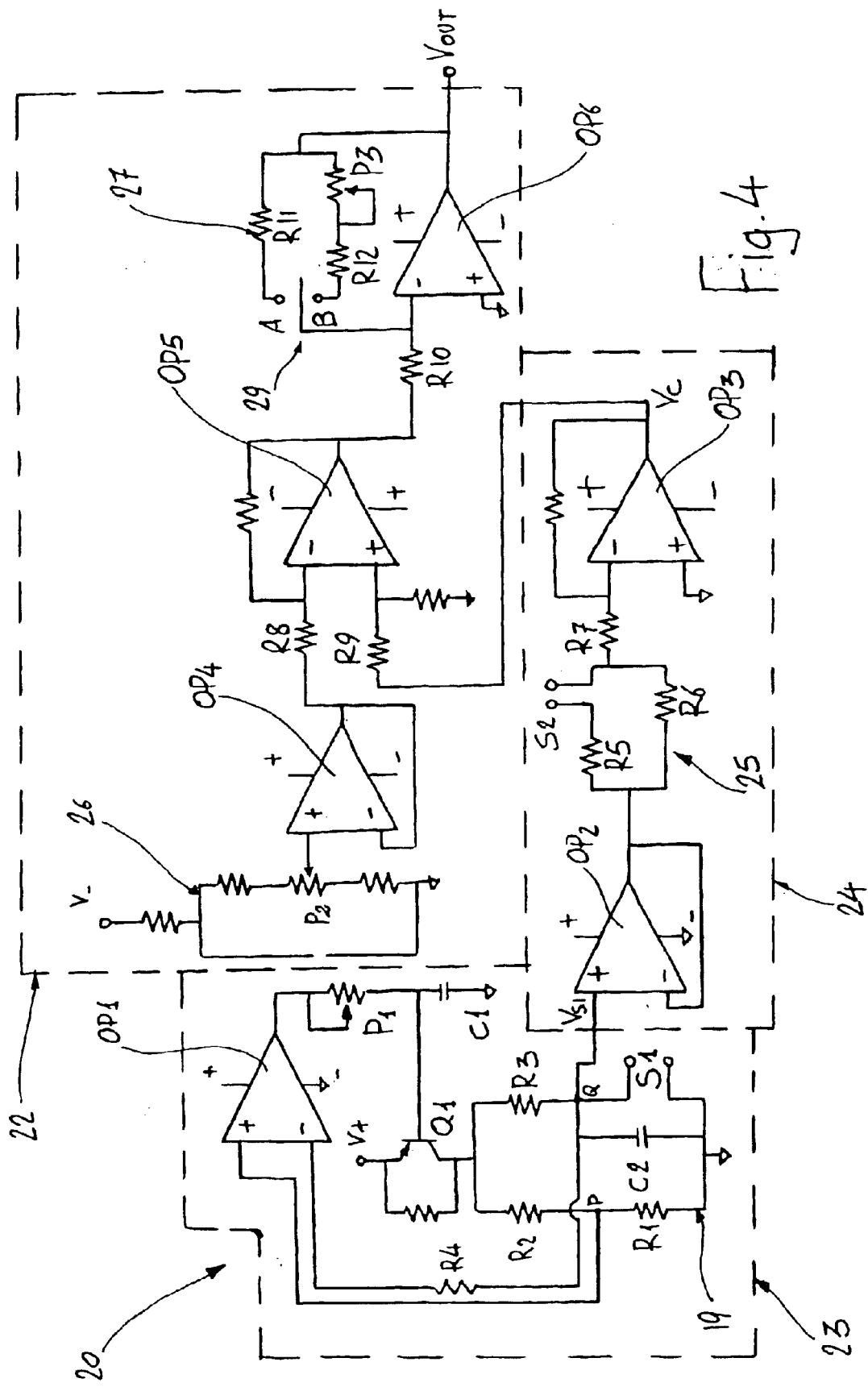
FIG. 4 is a more detailed diagram of the circuit represented by the block diagram of FIG. 3.

With initial reference to FIGS. 1 and 2, a flow-rate measuring device according to the present invention is generally indicated 1. The flow-rate measuring device 1 comprises a tubular body 2 through which the gas of which the flow-rate is to be measured flows. The direction of the gas-flow is indicated by the arrow G in FIG. 1. The tubular body 2 is connected to a duct 3 (shown partially) for supplying the gas to a burner of a heating apparatus (not shown). The gas flow-rate value obtained by the measuring device 1 as described in detail below is displayed on a display 4 (FIG. 3) preferably incorporated on a timer/thermostat. Moreover, prior to display, the hourly or daily flow is preferably converted, by a suitable conversion mechanism, into a consumption value and, in particular, by the introduction of the unit cost of the gas used, into a value indicating a cost sustained per unit of time for the quantity of gas measured by the device 1. Alternatively, the display 4 may be located on a wall or on a control panel of a domestic heating apparatus, or in a remote control for the operation of the apparatus and/or of a timer/thermostat.

The tubular body 2 comprises a shell 5 formed as a Venturi tube and including a converging portion 6, a narrow cross-sectioned portion 7, and a diverging portion 8. A grating 9 of predetermined mesh is positioned at the entry to the converging portion 6, with reference to the direction of the gas-flow, perpendicular to the flow, to even out the vector field of the velocities of the gas-flow passing through the tubular body 2.

Moreover, a first through-hole 10 and a second through-hole 11 are formed in the shell 5 of the tubular body 2, in alignment with one another in a direction parallel to an axis X of the tubular body 2 and a predetermined distance apart, for housing supports 15, 16 for a first sensor S, and a second sensor S2, preferably Negative Temperature Coefficient (NTC) sensors, also known as thermistors, for measuring the speed and the temperature of the gas-flow, respectively. The thermistors S1 and S2 are positioned in a manner such that they are completely enveloped by the gas-flow and are spaced from an internal wall 5a of the Venturi tube. The first hole 10 is formed in the narrow-sectioned portion 7 of the Venturi tube and the second hole 11 is formed in the converging portion 6.

The tubular body 2 also comprises a closure plate 12, fixed to the body 2, for example by screws 13, for preventing gas from leaking through the holes 10, 11 and for fixing the supports 15, 16 of the thermistors S1, S2. Fluid seals such as a gasket 14 are also interposed between the plate 12 and the tubular body 2.

The measuring device 1 also comprises a measurement circuit 20 the output voltage Vout of which is proportional, in accordance with a main characteristic of the invention, purely to the flow-rate value of the gas-flow and is independent of structural parameters of the sensors S1 and/or S2, except for negligible differences (generally of less than 2% for sensors of the same type). In other words, if the sensor S1 and/or S2 is replaced in the circuit 20, the value of the voltage Vout for a given gas flow-rate does not change.

The amplitude value of the voltage signal Vout output by the circuit 20 is then converted into a flow-rate value by a known curve, as explained below. This flow-rate value is converted again into a consumption value and is then displayed on the display 4.

The measurement circuit 20 comprises a first circuit 23 which is for keeping the resistance $R_{S1}$ of the thermistor S1 at a constant value and the voltage output signal $V_{S1}$ of which depends both on the gas flow-rate value and on the difference between the temperature of the gas and the temperature of the thermistor S1.

The circuit 20 also comprises a temperature-compensation circuit 24 for compensating for the above-mentioned dependence of the signal output by the circuit 23 on temperature. The voltage output signal Vc of this circuit 24 depends both on the gas flow-rate value and on the structural parameters of the thermistors S1 and/or S2. A calibration circuit 22, included in the measurement circuit 20, can eliminate the latter above-mentioned dependence.

The first circuit 23 comprises the hot-wire thermistor S1 which is kept at a temperature ($T_{sens}$) greater than the temperature of the gas ($T_{gas}$) in which it is immersed. By known laws of physics, the power dissipated in the thermistor S1 is:

$$W = I_{S1}^2 R_{S1} = \frac{V_{S1}^2}{R_{S1}} = (E + Fv^a)\Delta T$$

from which $V_{S1}^2 = f(v) R_{S1} \Delta T + P \Delta T$; in which E, F and a depend on the structural parameters of the thermistor S1 and on the type of gas used, v is the speed of the gas which is a variable of interest from which the gas flow-rate is obtained directly, and $\Delta T = T_{sens} - T_{gas}$.

As is known, the internal resistance of NTC thermistors is greatly dependent on temperature; in particular, as the temperature of the thermistor increases, its resistance decreases. The power absorbed by the thermistor S1 is also subject to variations with variations of the gas temperature, because of the thermal exchanges between the thermistor S1 and the molecules of the gas in which it is immersed. There may therefore be a variation in the heat-transfer coefficient between gas and sensor so that the voltage across the sensor S1 may also vary if the gas speed remains constant.

The value of the resistance RS1, and hence of the temperature, is kept constant and equal to a predetermined value by the first circuit 23, as described by way of example below.

The thermistor S1 is part of a resistive bridge network 19 including two branches in parallel with one another, the first branch comprising two resistors R1 and R2 of equal value in series with one another and the second branch comprising the thermistor S1 in series with a resistor R3.

A terminal of the thermistor S1 and a terminal of the resistor R1 are connected to earth, and a terminal of the resistor R2 and a terminal of the resistor R3 are connected to the emitter of a transistor Q1 the collector of which is connected to a terminal of a supply of a voltage $V_+$. Moreover, the non-earthed terminal of the thermistor S1 is connected (node Q), via a resistor R4, to the inverting input of an operational amplifier OP1 the non-inverting input of which is connected (node P) to the non-earthed terminal of the resistor R1. The output of the amplifier OP1 is also connected to the base of the transistor Q1.

A filter, comprising a capacitor C1 and a first potentiometer P1, is interposed between the output of the amplifier OP1 and the base of the transistor Q1 for introducing a suitable delay in the response of the first circuit 23 to variations in the temperature of the thermistor S1 should these variations be extremely rapid.

The voltage signal VS1 at the terminals of the sensor S1 is applied to the non-inverting input of an operational amplifier OP2 configured as a voltage follower. The output of the follower OP2 is connected to a terminal of a resistive network 25 comprising the second thermistor S2 (of resistance RS2) which detects the temperature of the gas in which it is immersed. The resistive network 25, which comprises two branches in parallel with one another, the first branch including the thermistor S2 and a resistor R5 and the second branch including a resistor R6, is also connected by its other terminal, via a resistor R7, to the inverting input of an operational amplifier OP3 in the inverting configuration, the output voltage of which is equal to Vc.

The calibration circuit 22 comprises a resistive network 26 including a second potentiometer P2 and connected between the terminals of a supply of a voltage V−. The potentiometer P2 is connected to the non-inverting input of an operational amplifier OP4 configured as a voltage follower, the output of which is connected, by a resistor R8, to the inverting input of an operational amplifier OP5 in differential configuration, to the non-inverting input of which the voltage Vc output by the second circuit 24 is applied, via a resistor R9. The voltage output by the differential amplifier OP5 is applied, via a resistor R10, to the inverting input of an operational amplifier OP6 in inverting configuration, the non-inverting input of which is connected to earth.

The amplifier OP6 has a gain which is variable with variations in the overall resistance of a fourth resistive network 27 by which the inverting input and the output of the operational amplifier OP6 are connected. The resistive network 27 comprises two branches, a first branch comprising a resistance R11 having a terminal A and an opposite terminal which is connected to a potentiometer P3, and a second branch comprising a resistance R12 having a terminal B, its other terminal being connected in series with the third potentiometer P3. The resistive network 27 also comprises a switch 29. When the switch 29 is connected to the terminal A, a current flows through the first branch of the resistive network 27 and the gain of the amplifier OP6 is unitary (naturally if R11=R10), whereas it adopts a value k, which can be modified by the potentiometer P3, when the switch 29 is connected to the terminal B and current flows through the second branch of the resistive network 27. The output voltage Vout of the measurement circuit 20 is present at the output of the amplifier OP6.

The measurement circuit 20 operates as follows.

In the circuit 23, the current IS1 which passes through the thermistor S1 varies as its temperature varies. The resistors R1–R3 are selected in a manner such that the resistive bridge network 19 is in equilibrium when the resistance of the sensor S1 corresponds to a predetermined value. The current variation is compensated as a result of a feedback, so as to bring the temperature back to the predetermined value. More particularly, the voltage VP at the node P is determined by the value of the resistance RS1 which initially is fixed and equal to the resistance of the resistor R3. In this condition, VQ-VP=0. When this potential difference varies because of a variation of the resistance RS1, the output voltage of the amplifier OP1, which is applied to the base of the transistor Q1 varies. This leads to a variation in the current flowing in the resistive bridge network 19, that is, a variation in the current IS1 passing through the thermistor S1, which is thus controlled in a manner such as to bring the temperature of the thermistor S1, or its resistance, back to the value of R3. The voltage VP2 is thus proportional to $f(v)\Delta T$.

The dependence of the voltage VP2 on $\Delta T$ is compensated by the circuit 24 since variations of the voltage VP due to temperature variations of the gas are compensated by similar variations, in the opposite direction, at the terminals of the resistive network 25 comprising the second thermistor S2. The voltage applied to the inverting input of the amplifier OP3 and hence also the voltage Vc output thereby is therefore independent of $\Delta T$ and depends solely on the speed of the gas flow and on the structural parameters E and F of the thermistor S1 (which change very little with changes of the sensor). For a given v and with variations of E and F, there is therefore a family of curves of known equation which represent the behaviour of the voltage Vc as a function of the speed v. The calibration circuit 22 can obtain from this family a single curve which relates the voltage output by the circuit to the speed, and hence to the flow-rate, of the gas. This curve is valid for whichever thermistor S1 is used, that is, Vout is proportional to $$V_{out2} \propto (E^* + F^* v^\alpha) \text{ when } E^* \text{ and } F^* \text{ are constant.}$$

This single curve is obtained operatively by making all of the curves of the family pass through two predetermined points, since it has been shown that all of the other points of each curve are thus also very close to the corresponding points of the other curves of the same family.

In a first operative condition in which the flow-rate of the gas through the tubular body 2 has a predetermined minimum value Qmin, the switch 29 is brought into contact with the terminal A of the resistive network 27 and the resistance of the potentiometer P2 is varied to achieve a value p for which the output voltage Vout of the circuit 22 is zero. In a second operative condition in which the flow-rate has a predetermined maximum value Qmax, the switch 29 is brought into contact with the terminal B, the resistance of the potentiometer P2 is p, and the resistance of the potentiometer P3 is varied until a gain of the amplifier OP6 of k is obtained, in which condition Vout=V*, where V* is a predetermined constant voltage value. Each curve of the above-mentioned family thus passes through the points (Qmin, 0) and (Qmax, V*). By "predetermined (minimum or maximum) value" is meant a reasonably predictable, as opposed to random, value determined before the gas flow begins. Similarly, by "predetermined constant voltage value" is meant a reasonably predictable, as opposed to random, value determined before the voltage is applied.

Subsequent measurements of Vout in order to obtain the flow-rate of the gas-flow are made whilst the switch is kept in contact with the terminal B, the resistance of the potentiometer is p, and the gain of the amplifier OP6 is k. It is thus possible to attribute to a value of the voltage Vout a single flow-rate value (which can be derived directly from the gas speed) using the single curve thus obtained and stored, irrespective of the thermistor S1 used (provided that the sensors are of the same type).

The invention thus solves the problem posed, achieving many advantages over known solutions. A first advantage lies in the low production cost of the device according to the invention since, by virtue of the calibration circuit, it is possible to use sensors of very low cost which do not need to have substantially constant constructional characteristics. A further advantage is that the measurement of speed and hence of flow-rate is relatively accurate owing to the positioning of the flow-rate sensor in the narrow-sectioned portion of the Venturi tube and to the presence of the grating upstream of the gas-flow enveloping the sensor of the invention.

Moreover, the diverging portion of the Venturi tube enables limited pressure losses to be achieved. Furthermore, the fact that an indication of the hourly or daily gas consumption is displayed on a display provides the user with immediate information which can be used to reduce consumption. Not least, the device according to the invention has great structural simplicity, since the temperature-compensation circuit is effective but of simple construction.

What is claimed is:

1. A device for measuring the flow-rate of a gas-flow in a duct, comprising:

a gas flow-rate sensor detecting the flow-rate and generating a first output signal proportional to the flow-rate detected;

a temperature-compensation circuit receiving the first output signal and generating a second output signal proportional to the flow-rate of gas detected by the flow-rate sensor and independent of at least one of the temperature of the gas and the temperature of the flow-rate sensor, the compensation circuit including a temperature sensor; and a calibration circuit receiving the second output signal of the temperature-compensation circuit, the behaviour of said second output signal being represented, for a fixed flow-rate, by a family of curves of known equation depending on the parameters of the flow-rate sensor, the calibration circuit having a first and a second resistive network of variable overall resistance by which each curve of the family representing the second output signal is made to pass through a first and a second predetermined fixed point, so that the calibration circuit generates a third output signal proportional to the gas flow-rate detected and independent of at least one of the structural parameters of the flow-rate sensor and the temperature sensor so that the third output signal is correlated with the flow-rate detected and independent of at least one of the temperature of the gas, the temperature of the flow-rate sensor, and the structural parameters of the flow-rate sensor.

2. The measuring device according to claim 1 in which the flow-rate sensor and the temperature sensor are NTC thermistors.

3. The measuring device according to claim 1 in which the first point is predetermined so that the third output signal generated by the calibration circuit has a value of substantially zero when the flow-rate of the gas supplied through the duct is at a predetermined minimum value.

4. The measuring device according to claim 3 in which the second point is predetermined so that the third output signal generated by the calibration circuit and correlated with the maximum flow-rate supplied through the duct is equal to a predetermined maximum value.

5. The measuring device according to claim 4 in which said second resistive network has a first branch, a second branch, and a switch selectively excluding one of the first and second branches, the first branch including a first resistor and the second branch including a first potentiometer whose resistance is fixed to a first value for which, when the switch is connected to the second branch and the flow-rate of the gas supplied through the duct is at a predetermined minimum value, the third output signal generated by the calibration circuit has a value of substantially zero.

6. The measuring device according to claim 5, in which said first resistive network has a second potentiometer whose resistance is fixed to a second value for which, when the switch is brought into contact with the second branch and the flow-rate of the gas supplied through the duct is at a predetermined maximum value, the third output signal generated by the calibration circuit has a value of a predetermined constant voltage.

7. The measuring device according to claim 1 in which the calibration circuit includes a first operational amplifier in differential configuration, to the inverting input of which a voltage the amplitude of which is variable in a predetermined manner is applied, and to the non-inverting input of which the second output signal from the temperature-compensation circuit is applied.

8. The measuring device according to claim 7 in which the calibration circuit further includes a second operational amplifier configured as a voltage follower, the output of which is connected to the inverting input of the first, differential amplifier and the non-inverting input of which is connected to the first resistive network.

9. The measuring device according to claim 8 in which the calibration circuit still further includes a third operational amplifier the inverting input of which is connected to the output of the first, differential amplifier and the non-inverting input of which is connected to earth and the output voltage of which is equal to the third output signal of the calibration circuit.

10. The measuring device according to claim 9 in which the second resistive network connects the inverting input and the output of the third amplifier.

11. The measuring device according to claim 10 in which said second resistive network has a first branch, a second branch, and a switch selectively excluding one of the first and second branches such that, when the switch is connected to the first branch, the gain of the third amplifier is unitary, and when the switch is connected to the second branch, the gain of the third amplifier is equal to a predetermined value.

12. The measuring device according to claim 1, further comprising a first circuit keeping the temperature of the flow-rate sensor equal to a predetermined constant temperature value.

13. The measuring device according to claim 12 in which the first circuit comprises feedback means including an operational amplifier the non-inverting input of which is connected to a terminal of the flow-rate sensor and the output of which is connected to the base of a transistor, the emitter of the transistor being connected to a resistive bridge network comprising the flow-rate sensor so that, for variations of a voltage at the terminals of the flow-rate sensor caused by variations from the predetermined temperature of the flow-rate sensor, there are corresponding corrective variations of a current passing through the flow-rate sensor in order to bring the temperature value of the flow-rate sensor back to the predetermined temperature value.

14. The measuring device according to claim 13 in which the temperature-compensation circuit comprises an operational amplifier configured as a voltage follower, to the non-inverting input of which the output signal of the flow-rate sensor is applied and the output of which is connected to a third resistive network comprising the temperature sensory.

15. The measuring device according to claim 14 in which the third resistive network is such that, for variations of the voltage output by the flow-rate sensor caused by gas-temperature variations, there are corresponding similar variations, in the opposite direction, of the output voltage of the second resistive network, so that the signal output by the third resistive network is independent of temperature.

16. The measuring device according to claim 1, further comprising a tubular body defining a Venturi tube through which the gas flows, the Venturi tube being in fluid communication with the duct, the flow-rate sensor being positioned in a portion of the Venturi tube having a narrow cross-section, and the temperature sensor being positioned in a converging portion of the Venturi tube.

17. The measuring device according to claim 16 further comprising a grating of predetermined mesh positioned upstream of the tubular body, with reference to the direction of flow of the gas, to even out the field of velocities of the gas.

18. The measuring device according to claim 1, further comprising indicator means for displaying a value correlated with a cost per unit of time of the quantity of gas measured by the device.

19. The measuring device according to claim 18, further comprising means for converting the value of the signal output by the calibration circuit, which is proportional to the flow-rate of the gas, into a consumption value.

20. A device for measuring the flow-rate of a gas-flow in a duct, comprising:
a gas flow-rate sensor detecting the flow-rate and generating a first output signal proportional to the flow-rate detected;
a temperature-compensation circuit receiving the first output signal and generating a second output signal proportional to the flow-rate of gas detected by the flow-rate sensor and independent of at least one of the temperature of the gas and the temperature of the flow-rate sensor, the compensation circuit including a temperature sensor;
a calibration circuit receiving the second output signal of the temperature-compensation circuit, the behaviour of said second output signal being represented, for a fixed flow-rate, by a family of curves of known equation depending on the parameters of the flow-rate sensor, the calibration circuit having a first and a second resistive network of variable overall resistance by which each curve of the family representing the second output signal is made to pass through a first and a second predetermined fixed point, so that the calibration circuit generates a third output signal proportional to the gas flow-rate detected and independent of at least one of the structural parameters of the flow-rate sensor and the temperature sensor so that the third output signal is correlated with the flow-rate detected and independent of at least one of the temperature of the gas, the temperature of the flow-rate sensor, and the structural parameters of the flow-rate sensor, wherein:

(a) the second resistive network has a first branch, a second branch, and a switch selectively excluding one of the first and second branches, the first branch including a first resistor and the second branch including a first potentiometer whose resistance is fixed to a first value for which, when the switch is connected to the second branch and the flow-rate of the gas supplied through the duct is at a predetermined minimum value, the third output signal generated by the calibration circuit has a value of substantially zero, and (b) the first resistive network has a second potentiometer whose resistance is fixed to a second value for which, when the switch is brought into contact with the second branch and the flow-rate of the gas supplied through the duct is at a predetermined maximum value, the third output signal generated by the calibration circuit has a value of a predetermined constant voltage;

a first circuit keeping the temperature of the flow-rate sensor equal to a predetermined constant temperature value;

indicator means for displaying a value correlated with a cost per unit of time of the quantity of gas measured by the device; and means for converting the value of the signal output by the calibration circuit, which is proportional to the flow-rate of the gas, into a consumption value.

* * * * *